United States Patent [19]

Vrouwenvelder

[11] Patent Number: 5,129,805
[45] Date of Patent: Jul. 14, 1992

[54] APPARATUS FOR ADJUSTING THE LENGTH OF DOUGH STRANDS AND FOR TRANSFERRING THE LENGTH-ADJUSTED DOUGH STRANDS

[75] Inventor: Curinus C. Vrouwenvelder, 's-Hertogenbosch, Netherlands

[73] Assignee: Benier B.V., Netherlands

[21] Appl. No.: 676,790

[22] Filed: Mar. 28, 1991

[30] Foreign Application Priority Data

Apr. 6, 1990 [NL] Netherlands .................. 9000814

[51] Int. Cl.⁵ .................. A21C 3/02; B29C 43/22; B29C 43/58
[52] U.S. Cl. .................. 425/135; 425/335; 425/337; 425/340; 425/343; 425/363; 425/366; 425/394
[58] Field of Search .................. 426/502, 504; 425/335, 425/337, 340, 343, 366, 363, 135, 150, 145, 341, 383, 394

[56] References Cited

U.S. PATENT DOCUMENTS

| | | | |
|---|---|---|---|
| 745,018 | 11/1903 | Kessler | 425/337 |
| 873,396 | 12/1907 | Walters | 425/363 |
| 2,140,213 | 12/1938 | Tegarty | 425/363 |
| 3,470,583 | 10/1969 | Denyes et al. | 425/363 |
| 4,403,937 | 9/1983 | Zamparelli et al. | 425/337 |
| 4,626,188 | 12/1986 | Morgenthaler et al. | 426/502 |

*Primary Examiner*—Willard Hoag
*Attorney, Agent, or Firm*—Brumbaugh, Graves, Donohue & Raymond

[57] ABSTRACT

The invention relates to an apparatus for adjusting the length of dough strands, comprising a receiving gutter, V-shaped in cross-section, whose walls are defined by elements which engage a dough strand placed in the gutter at regularly spaced apart locations along the length of the dough strand and can exert axial forces thereon. According to the invention, the elements which define the walls of the receiving gutter and engage the dough strands are formed by rolling members arranged with interspaces and adapted to be driven progressively and selectively from the middle (X—X) of the gutter in either direction, and support members which convey the strands transversely of the gutter are arranged between the rolling members. The mutual arrangement of the gutter and of the support members is variable, at least as to the relative level.

12 Claims, 3 Drawing Sheets

APPARATUS FOR ADJUSTING THE LENGTH OF DOUGH STRANDS AND FOR TRANSFERRING THE LENGTH-ADJUSTED DOUGH STRANDS

This invention relates to an apparatus for adjusting the length of dough strands and for transferring the length-adjusted dough strands.

The term "strand" as used herein generally refers to a continuous generally cylindrical elongate piece of dough.

In the mechanical manufacture of bread and breadlike products, measured dough portions, usually after a proofing process, are rolled out, rolled up and then molded to adjust to the proper length and diameter. Such molded dough strands are deposited, for instance in a baking pan, in a gauze-shaped semicylindrical holder or on a refrigeration conveyor. It will be clear that for the mechanical performance of these operations, the dough strands must be adjusted to the precise length required and supplied in accurately centred position.

In particular when, starting from a given dough weight, a dough strand of comparatively great length is to be obtained, during rolling out, deviations from the centre will occur, so that the dough strand upon discharge is no longer properly centred and fluctuations in length will occur, among other things, as a result of fluctuations in the dough preparation process, at a given setting of the rolling apparatus.

In practice a method is known, wherein dough strands are adjusted to an excess length and subsequently, while they are lying on a conveyor belt, are guided between moving correction belts disposed on edge and converging in the direction of transport. A drawback of this method is that the dough strands are upset almost exclusively at their ends and, when supplied in non-centred position, in non-uniform manner as well. In all cases, the forced reduction of length is not uniformly distributed along the length of the dough strands and the resultant dough strand is irregularly shaped.

French patent application No. 2 523 812 discloses an apparatus comprising two series of panels, wherein the panels of the respective series are adapted to be moved towards and away from each other along two parallel, horizontal shafts through the intermediary of springs and further are bearing-mounted for pivotal movement between a position where the panels of the series are substantially vertical and a position where the panels form a V-shaped dough-strand receiving gutter. The advantage of that apparatus is that a dough strand is clamped at regularly spaced locations in the bottom of the V-shaped groove between pairs of oppositely arranged panels and by moving the pairs of panels away from or towards each other in the longitudinal direction of the gutter, the dough strand is proportionally lengthened or shortened.

A drawback of this known apparatus is that during length adjustment of a dough strand the two halves always deform equally and these halves cannot be separately influenced. Another disadvantage is that the transfer of a length-adjusted dough strand is effected by swinging apart the lower ends of the panels, i.e. by swinging open the V-shaped gutter. During the subsequent drop of the dough strands, they may shrink and/or lose their straightness. This last is a drawback in particular when the length-adjusting apparatus delivers the dough strands to a refrigeration conveyor.

It is an object of the invention to provide an apparatus of the type at hand, in which these drawbacks are overcome.

To that effect, in an apparatus for adjusting the length of dough strands, comprising a receiving gutter, V-shaped in cross-section, whose walls are defined by elements which engage a dough strand placed in the gutter at regularly spaced apart locations along the length of the dough strand and can exert axial forces thereon, according to the invention, the elements which define the walls of the receiving gutter and engage the dough strands are formed by rolling members arranged with interspaces and adapted to be driven progressively and selectively from the middle of the gutter in either direction, and support members which convey the strands transversely of the gutter are arranged between the rolling members, the mutual arrangement of the gutter and of the support members being variable, at least as to the relative level.

A dough strand received in the gutter is adjusted to a desired length by the rotating rolling members. Driving the rolling members progressively and selectively enables keeping the cross-section of the dough strand substantially constant during lengthening or shortening. By driving the rollers in proportion to the dough migration from the middle towards the ends of a dough strand, the length/diameter ratio of the dough strand can be controlled as desired. In this procedure, due account can be taken of the circumstance that when a dough strand is being lengthened through the exertion of lateral rolling forces thereon, from the middle towards the ends increasingly more dough is displaced at each successive section.

By means of end signalling, the drive of the rolling means can be controlled for each half of the gutter, so that the lengthened or shortened dough strand is centred at all times.

When length-adjustment has been completed, the dough strand is taken over by the support members, which discharge the dough strand transversely of the longitudinal axis of the gutter.

The support members can be formed by discs that are rotatable about an axis parallel to the gutter and can be moved in the interspaces between the rolling members.

This take-over can be effected by moving the rolling members downwards.

Discharge conveying means, such as a receiving belt, may be provided adjacent the discs.

In the transfer of dough strands from the discs to the receiving belt, according to the invention a hold-down can be used which, at least at regularly spaced locations, engages a dough strand and provides for its transfer from the discs to the discharge conveying means in the length-adjusted position.

According to the invention, the hold-down may be formed by a hold-down roller made of flexible material such as foam rubber, which is bearing-mounted on a pivot for free pivotal movement.

To clarify the invention, one embodiment of the apparatus for adjusting the length of dough strands and for transferring them will be described with reference to the accompanying drawings.

Figure 1:
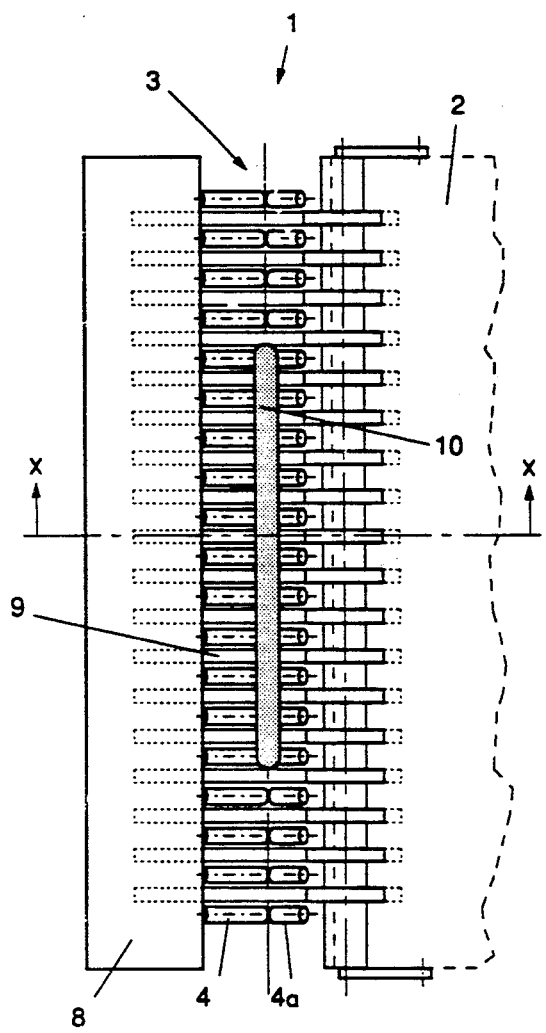
FIGS. 1–6 are top plan views of the apparatus in successive stages of length adjustment and transfer of a dough strand.
Figure 1A:
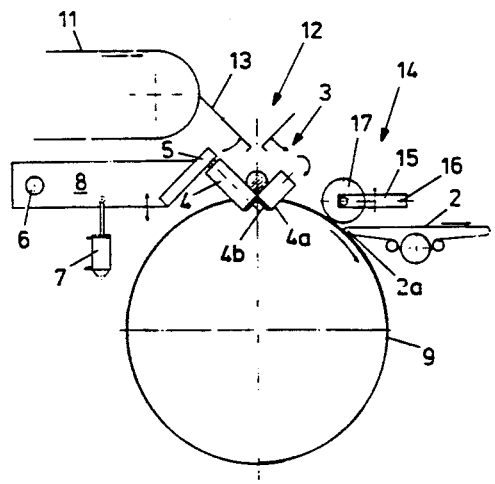
FIGS. 1A and 4A are respective end views of the apparatus in the operative stages of FIGS. 1 and 4, respectively.

Referring to FIGS. 1 and 1A, in the embodiment shown there is provided an apparatus 1 for length-adjusting dough strands and transferring the length-adjusted dough strands to a discharge conveyor 2, comprising a receiving gutter 3, substantially V-shaped in cross-section, whose walls are formed by series of rollers 4 and 4a, respectively.

The rollers 4 and 4a are coupled pairwise, for example by means of chain wheels or gears 4b for synchronously driving pairs from a driving mechanism 5 which is supported by a supporting beam 8 adapted for pivotal movement about a pivot 6 by means of a piston-cylinder assembly 7.

In the spaces between successive roller pairs 4, 4a in the longitudinal direction of the gutter 3, bearing discs 9 are mounted for rotation according to the arrow shown in FIG. 1A.

The operation of the apparatus 1 is as follows:

A dough strand 10 is supplied by a conveyor 11, and, via a swinging gutter 12 with swing-out walls 13, brought into a central position above the receiving gutter 3 and released. The dough strand 10 then falls from the swinging gutter 12 to the central part of the receiving gutter 3. When the dough strand 10 has arrived in the receiving gutter 3, the positions of the ends of the dough strands can be signalled by means not shown, for example photo cells or mechanical scanners.

The rollers 4, 4a are driven for lengthening from the middle (or shortening towards the middle) the two dough strand halves. As soon as the ends of the dough strand have reached the positions on either side of the middle of the receiving gutter that correspond to the desired length, the rollers 4, 4a are stopped on the corresponding sides. The result is a dough strand that has the desired length and a constant cross-section and is centred relative to the transverse median plane X—X in the middle of the receiving gutter.

For the transfer of the length-adjusted and centred dough strand 10, it is taken over by the bearing discs 9. In the embodiment shown, this is done by swinging down the receiving gutter 3 by means of the piston-and-cylinder assembly 7. To minimize the swinging movement that is required to enable the discs 9 to take over the dough strand 10 without a free fall, the rollers 4a are made relatively short. It will be clear that the transfer of the dough strand from the receiving gutter 3 to the bearing discs 9 could also be realised by moving the discs 9 upwards or by performing both movements—moving the rollers 4, 4a down and the discs 9 up—simultaneously.

Figure 2:
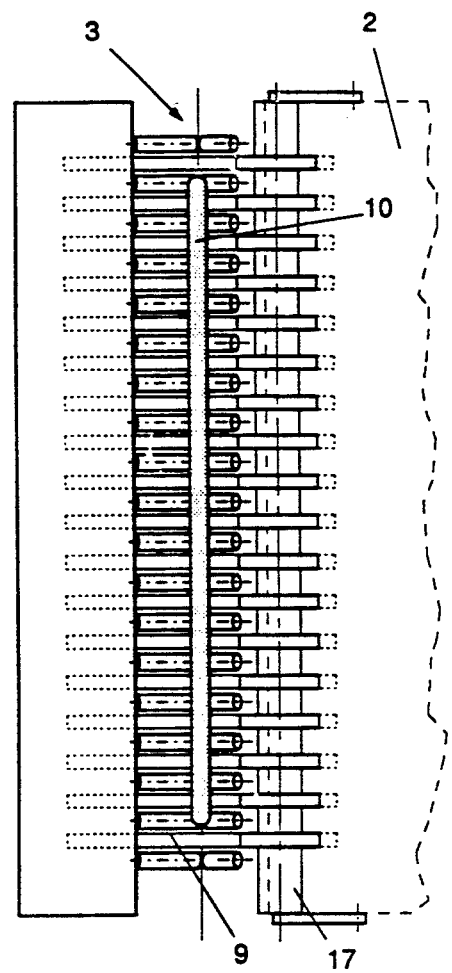
Figure 3:
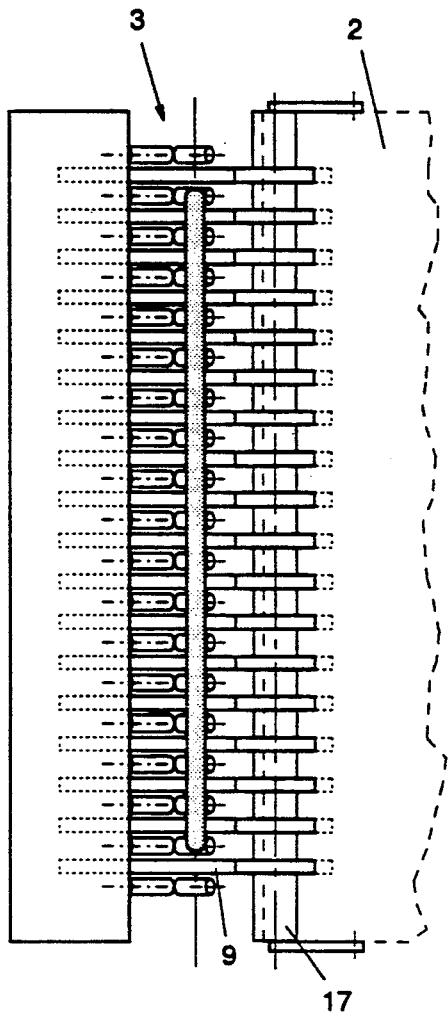
Figure 4:
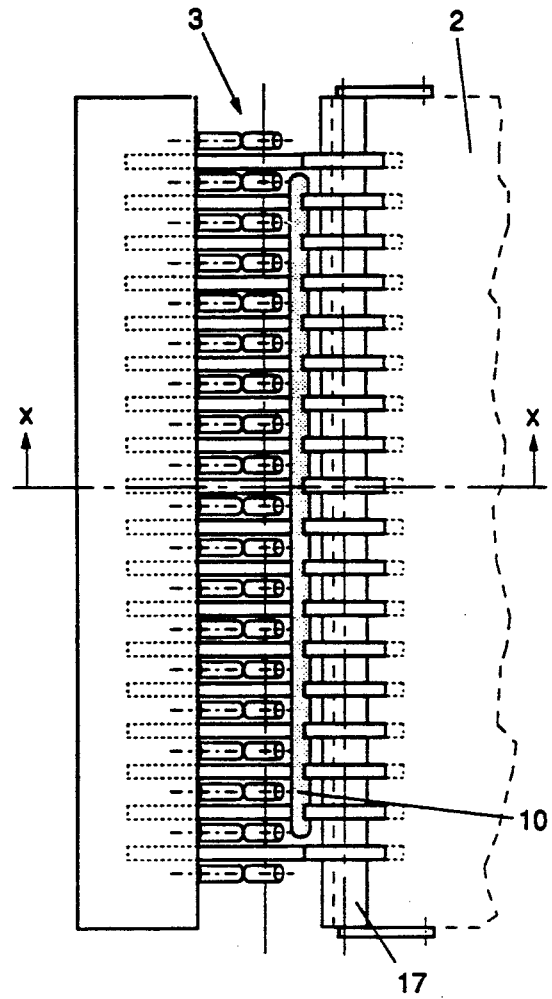
Figure 4A:
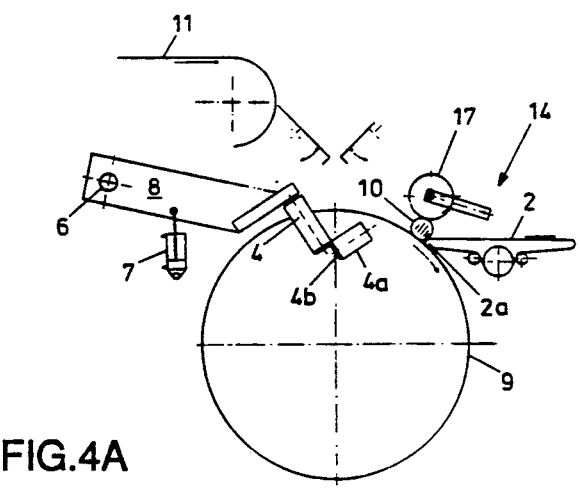
Figure 5:
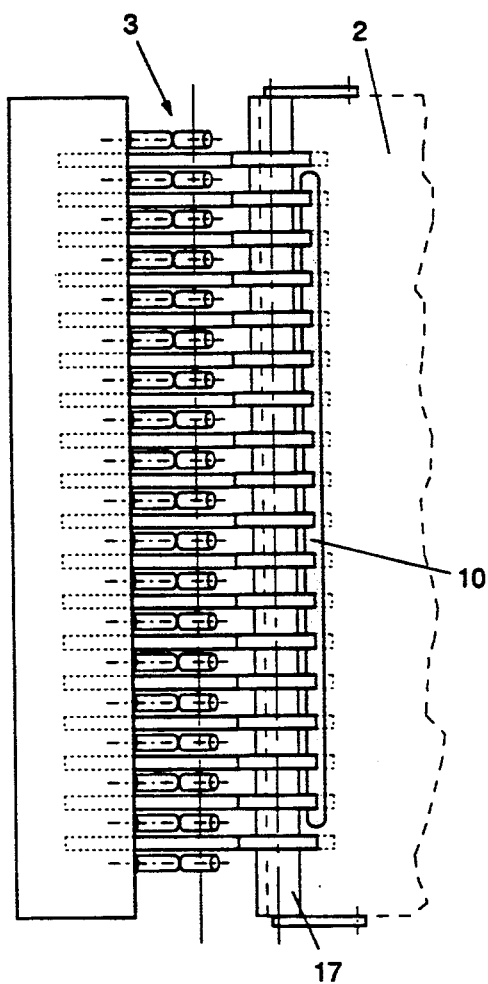
Figure 6:
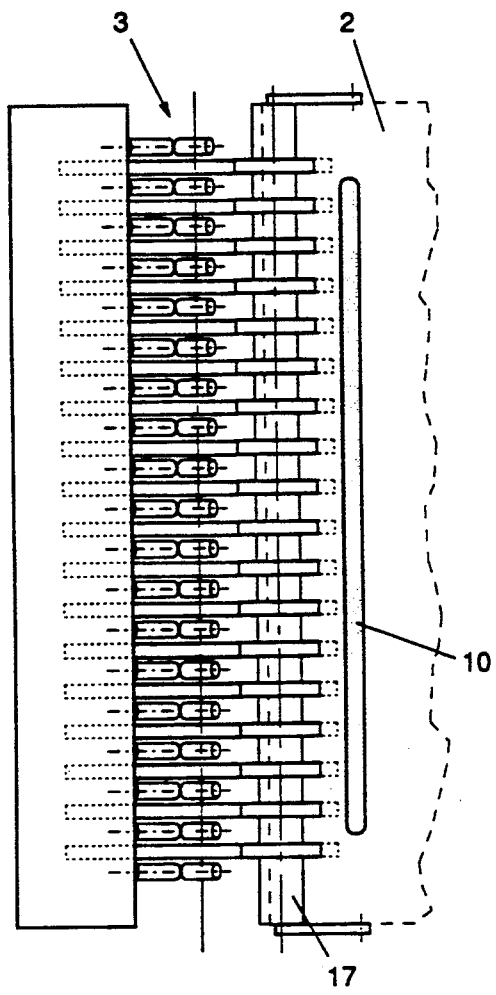

Intermediate stages of this transfer are shown in FIGS. 2, 3 and 4. As will be clear from FIG. 4A, in the stage of FIG. 4 the strand 10 has arrived at nose 2a of the discharge conveyor 2. In the subsequent stages according to FIGS. 5 and 6, the dough strand 10 is already being carried by the discharge conveyor 2.

A hold-down 14 can be used to prevent the dough strand from yet shrinking or deforming during the transition from the bearing discs 9 to the discharge conveyor 2, in particular during the bridging of the space between the bearing discs 9 and the nose 2a of the discharge conveyor 2, when briefly the dough strand 10 is not supported throughout its entire length. The hold-down 14 is provided with a roller 17 bearing-mounted for free rotation and pivotal movement about a pivot 16 via arms 15, which the dough strand 10, at least at points regularly spaced along its length, is held in contact with during the transition from the bearing discs 9 to the discharge conveyor 2, since the dough strand 10, on its way from the bearing discs 9 to the discharge conveyor 2, pushes up the roller 17 against gravity and rolls under it. The hold-down roller 17 is provided with soft material, for example rings 18 made of foam rubber.

It will be clear that the invention is not in any way limited to the embodiment shown in the drawings. An essential aspect is that dough strands are length-adjusted in a receiving gutter, whose walls are defined by elements that are operative at short spatial intervals and are adapted to exert axial forces on a dough strand in a selective manner, i.e. in pairs of oppositely disposed elements, which can be switched on and off separately in pairs, and that laterally operative conveying means take over the length-adjusted and centred dough strand without a fall.

I claim:

1. Apparatus for adjusting the length of a strand of dough comprising:
   an elongate horizontally disposed receiving gutter having a V-shaped cross-section, the walls of which are defined by pairs of rolling elements disposed at regularly spaced apart locations along the length of the gutter for engaging and exerting axial forces on a dough strand placed in the gutter
   means for driving said rolling elements progressively and selectively in either direction from the middle of the gutter, and
   support members arranged between said rolling elements for conveying the dough strand transversely of the gutter and discharging the strand to conveying means, the mutual arrangement of the gutter and the support members being variable, at least with respect to relative level.

2. Apparatus according to claim 1, wherein said apparatus includes signalling means for sensing the ends of the dough strand and controlling the drive of the folling elements on either side of said middle of the gutter.

3. Apparatus according to claim 1 wherein said support members comprise discs supported for rotation about an axis parallel to the gutter and movement into interspaces between the rolling elements.

4. Apparatus according to claim 3, wherein said rolling elements are movable downwards relative to the support members.

5. Apparatus according to claim 1, wherein said apparatus further comprises hold-down means which engages a dough strand at least at regularly spaced locations along a length thereof for transferring a length-adjusted dough strand to said conveying means.

6. Apparatus according to claim 5, wherein said hold-down means comprises a roller made of flexible material such as foam rubber, said roller being bearing-mounted on a pivot for free pivotal movement relative o said support members.

7. Apparatus according to claim 2, wherein said support members comprise discs supported for rotation about an axis parallel to the gutter and movement into the interspaces of the rolling elements.

8. Apparatus according to claim 7, wherein said rolling elements are movable downwards relative to the support members.

9. Apparatus according to claim 4, wherein said apparatus further comprises hold-down means which engages a dough strand at least at regularly spaced locations along a length thereof for transferring a length-adjusted dough strand to said conveying means.

10. Apparatus according to claim 8, wherein said apparatus further comprises hold-down means which engages a dough strand at least at regularly spaced locations along its length for transferring a length-adjusted dough strand to said conveying means.

11. Apparatus according to claim 9, wherein said hold-down means comprises a roller made of flexible material, said roller being bearing-mounted on a pivot for free pivotal movement relative to said support members.

12. Apparatus according to claim 10, wherein said hold-down means comprises a roller made of flexible material, said roller being bearing-mounted on a pivot for free pivotal movement relative to said support members.

* * * * *

UNITED STATES PATENT AND TRADEMARK OFFICE
CERTIFICATE OF CORRECTION

PATENT NO. : 5,129,805
DATED : July 14, 1992
INVENTOR(S) : Curinus C. Vrouwenvelder It is certified that error appears in the above-identified patent and that said Letters Patent is hereby corrected as shown below:

Title page, item [56], after Morgenthaler et al....426/502 insert

--4,636,129  1/87  Lanham, Jr. ........414/417
  4,824,356  4/89  Benier .............425/373

FOREIGN PATENT DOCUMENTS 2 523 812  3/82  France .............11/16--;

Column 4, line 40, "folling" should read --rolling--;

Column 4, line 57, "o said" should read --to said--.

Signed and Sealed this

Fourteenth Day of September, 1993

Attest:

BRUCE LEHMAN

Attesting Officer

Commissioner of Patents and Trademarks